(12) United States Patent
Everett

(10) Patent No.: US 6,237,848 B1
(45) Date of Patent: May 29, 2001

(54) READING DATA FROM A SMART CARD

(75) Inventor: David Everett, Brighton (GB)

(73) Assignee: Mondex International Limited, London (GB)

( * ) Notice: Subject to any disclaimer, the term of this patent is extended or adjusted under 35 U.S.C. 154(b) by 0 days.

(21) Appl. No.: 08/343,540

(22) PCT Filed: Apr. 5, 1994

(86) PCT No.: PCT/GE94/00715

§ 371 Date: Nov. 29, 1994

§ 102(e) Date: Nov. 29, 1994

(87) PCT Pub. No.: WO94/23399

PCT Pub. Date: Oct. 13, 1994

(30) Foreign Application Priority Data

Apr. 1, 1993 (GB) .................................................. 9306805

(51) Int. Cl.[7] ............................. G06K 5/00; G06K 19/06
(52) U.S. Cl. ............................................. 235/380; 235/492
(58) Field of Search ..................................... 235/379, 380, 235/385, 441, 486, 492, 494; 705/30–44

(56) References Cited

U.S. PATENT DOCUMENTS

| 4,727,244 | * | 2/1988 | Nakano et al. | 235/380 |
|---|---|---|---|---|
| 4,746,787 | | 5/1988 | Suto et al. | 235/380 |
| 4,794,236 | | 12/1988 | Kawana et al. | 235/492 |
| 4,797,542 | | 1/1989 | Hara | 235/380 |
| 4,829,169 | * | 5/1989 | Watanabe | 235/492 |
| 4,870,604 | | 9/1989 | Tatsuno | 364/708 |
| 5,034,596 | | 7/1991 | Utsunomiya | 235/380 |
| 5,070,233 | * | 12/1991 | Takizawa et al. | 235/380 |
| 5,247,164 | * | 9/1993 | Takahashi | 235/492 |
| 5,310,999 | * | 5/1994 | Claus et al. | 235/384 |
| 5,352,877 | * | 10/1994 | Morley | 235/494 |
| 5,406,275 | * | 4/1995 | Hassett et al. | 235/384 X |
| 5,414,835 | * | 5/1995 | Iijima | 235/380 X |
| 5,478,991 | * | 12/1995 | Watanabe et al. | 235/384 X |

FOREIGN PATENT DOCUMENTS

| 2 189 741 | 11/1987 | (GB) | 235/380 |
|---|---|---|---|
| 2 258 748 | 2/1993 | (GB) | 235/380 |
| 4-205291 | 7/1992 | (JP) . | |
| 1-194090 | 8/1998 | (JP) . | |

* cited by examiner

*Primary Examiner*—Thien M. Le
(74) *Attorney, Agent, or Firm*—Nixon & Vanderhye P.C.

(57) ABSTRACT

A method of reading use-variable data from a smart card (1) includes selected data in the answer-to-reset signal sent from the card in response to a reset signal sent from a card reader (4). In this way a reader can be employed with inexpensive components and limited processing power since full implementation of a communication protocol is not required. An inexpensive key-fob (3) is provided for reading the value balance (7) of an electronic purse card, for example.

17 Claims, 5 Drawing Sheets

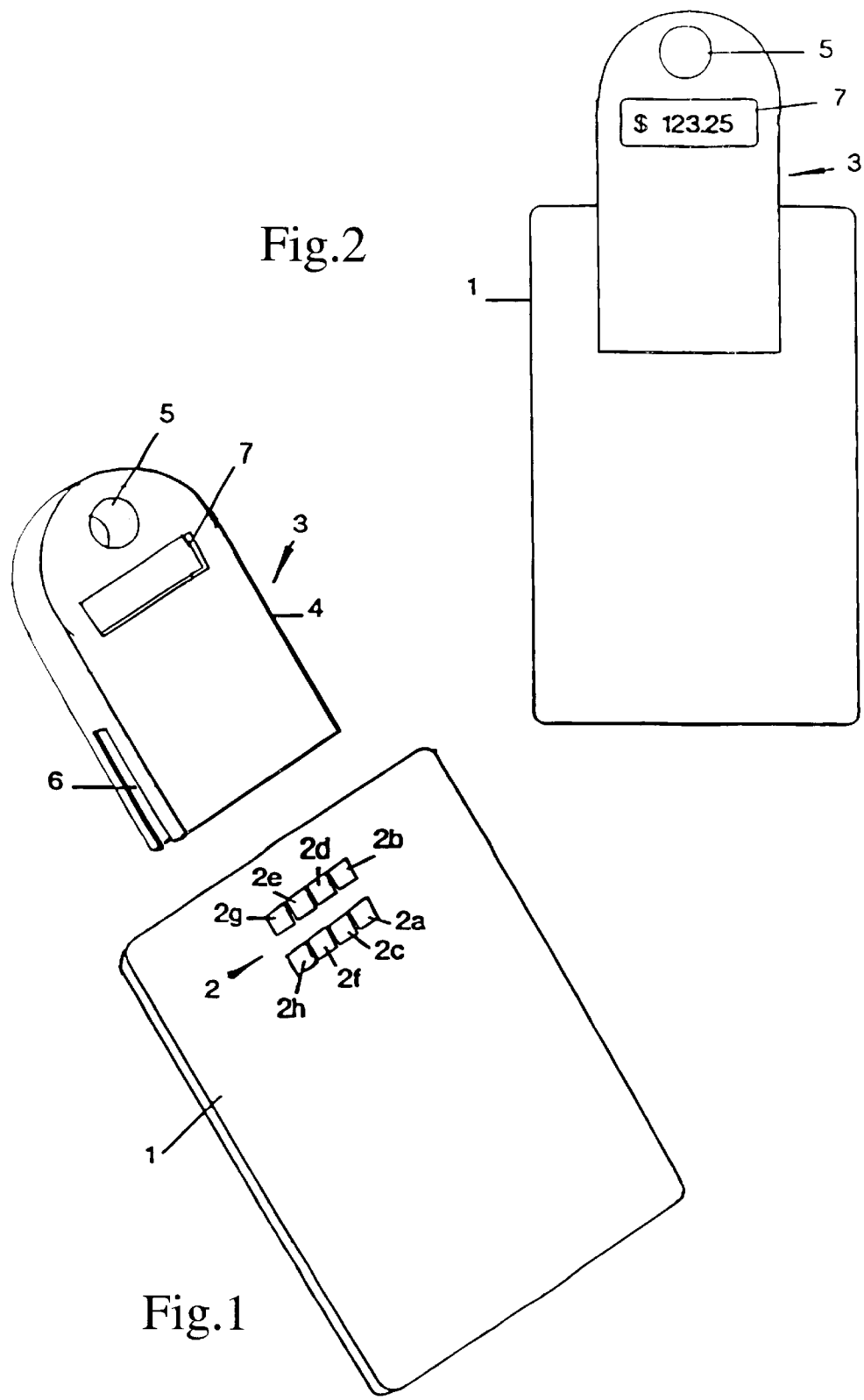

READING DATA FROM A SMART CARD

BACKGROUND OF THE INVENTION

1. Field of the Invention

The invention relates to data reading from a smart card.

2. Discussion of Prior Art

A smart card, otherwise known as an integrated circuit card, is a card carrying a microprocessor, memory, and an interface for electrical coupling to read/write devices. Preferably the memory is non-volatile, by which is meant memory which retains information in the absence of electrical power. Typically, memories used in smart cards are of the Electronic Erasable Programmable Read Only Memory (EEPROM) type. Such cards may be used for many purposes, such as for carrying personal information, perhaps for example medical information or for personal identification purposes. Alternatively, such cards may be used as bank cards or payment cards. An application for smart cards to which the present invention is particularly, but not exclusively, applicable is as electronic purses. Electronic purses hold value data which may be uploaded and downloaded by communication with a bank or other financial institution. Value may be exchanged between electronic purses which are coupled by a data link. Thus purchases may be made, using the value data as "electronic cash". Smart cards can carry an appreciable amount of information in a secure manner. Data in the card may include fixed data set at manufacture, such as a card serial number or the like. However this fixed data is not of interest to users. The card is used to input, store and output variable data. Although some of this data may in practice not be changed after first being input, it is different from data fixed by the manufacturer of the card and is use-variable data. More usually, use-variable data is data changed regularly in the normal use of the card. Smart card use-variable data is read to and from the card serially via the contacts using an established protocol.

The read protocol as exemplified in ISO protocol 7816 which requires that when coupling is established between a reader and the card, the reader applies power and clock and reset signals to the card microprocessor. Then, an Answer to Reset (ATR) sequence of data bytes is transmitted from card to reader. Thereafter the card may be interrogated by the reader to transmit demanded use-variable data.

This requires a reader of relative sophistication and expense.

There is a requirement for an inexpensive reader to allow display or use of selected use-variable data from the card. The use-variable data to be read will vary from application to application. In a medical or diary card it may be the details of a next appointment; in a security card it may be a security code to gain access via a lock-release reader; and in an electronic purse it may be the value of the balance remaining. The present invention seeks to provide a system which allows the provision of an inexpensive smart card reader.

SUMMARY OF THE INVENTION

According to one aspect of the invention there is provided a method of reading data from a smart card, the smart card having a microprocessor and a memory holding use-variable data, the method consisting in coupling a reader to the card to establish a data transmission path between the reader and the card, accessing required use-variable data in said memory and incorporating said accessed data as part of an answer-to-reset signal transmitted from the card to the reader.

In this way data required to be read can be transmitted to the reader in the ATR sequence and the reader does not require the capacity for full protocol-regulated card interrogation as is conventional. The reader can thus be simple and inexpensive.

In the ISO standard 7816 the ATR sequence may include "historical bytes". These are generally provided for the convenience of the card manufacturer to represent a card identifier for example. Preferably, in the present invention, at least some of the "historical bytes" of the ATR are used to convey the required data.

The reset signal is conveniently initiated in the reader automatically in response to coupling being made with a card, and the card automatically responds with the Answer to Reset sequence.

A modification envisaged is that the data included in the ATR sequence may be sequentially changed on each reading. Thus, for example, the data read from an electronic purse may alternate between the balance and details of the last transaction. If a third or other items of information are to be included the data read will step one step around the required sequence each time the card is applied to a reader. This may be accomplished by providing a sequence of data addresses in the EEPROM and arranging that each time the ATR sequence is sent an address pointer is stepped cyclically around the address sequence so that on the next reading data from the next address is sent in the ATR sequence.

According to another aspect of the invention there is provided a reader adapted to read data from a smart card in accordance with the above-described method, the reader comprising a battery, an interface arrangement for coupling to a smart card, and circuit means effective to interpret a specific part of any answer-to-reset signals received via the interface to derive use-variable data included therein.

The circuit means may be a dedicated integrated circuit incorporating, by virtue of its structure, logic appropriate for the interpretation of the answer-to-reset signals. Alternatively, the circuit means may comprise a general-purpose microprocessor and a memory including a program to control the microprocessor.

The reader may be incorporated in a small hand-held unit smaller than the smart card and a key-fob is envisaged, for example. A slot to accept a contact portion of the card is provided and need be large enough to accept only a side region or corner region of the card, for example.

According to another aspect of the invention there is provided a smart card adapted to have data read in accordance with the above-described method, the card having a microprocessor and a memory, a memory region holding use-variable data, and a memory region holding an operating program, the operating program being effective to include, in answer-to-reset signals generated by the card, specific use-variable data accessed from the memory.

BRIEF DESCRIPTION OF THE INVENTION

The invention will be further described with reference to the accompanying drawings, of which:

FIG. 1 is a perspective view of a smart card and a smart card reader in accordance with the invention;

FIG. 2 is a plan view of the reader of FIG. 1 with the card inserted;

Figures 6A, 6B:
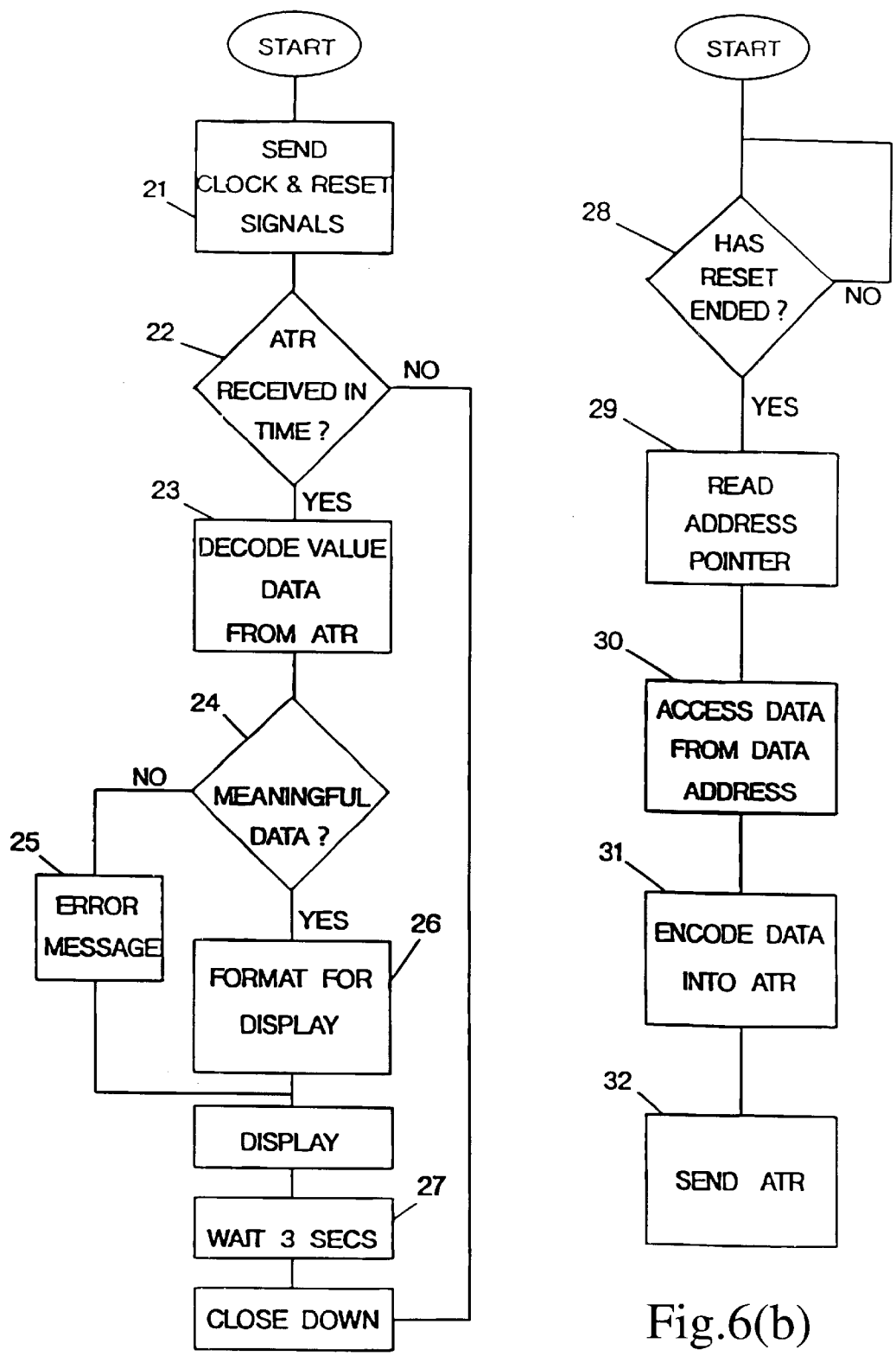

FIGS. 6*a*–*b* are flow charts for the programs in the reader and card; and

Figure 7:
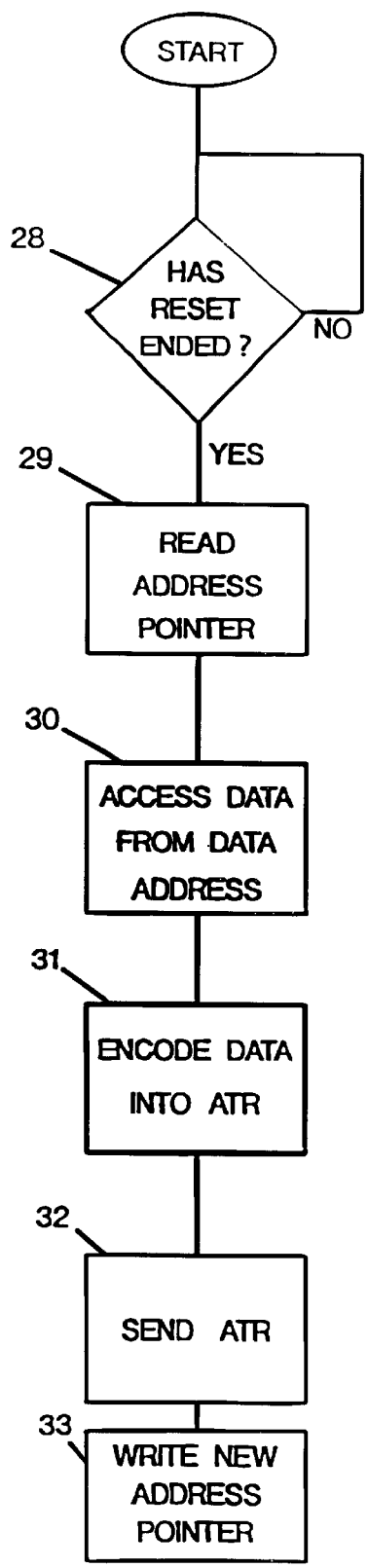

FIG. 7 is a flow chart illustrating a modification for enabling sequentially different read-outs from the card.

DETAILED DISCUSSION OF PREFERRED EMBODIMENTS

Referring to FIG. 1 there is shown a smart card 1 which constitutes an electronic purse in a value transfer system. The card is of credit card size and has an internal microprocessor and Electronic Erasable Programmable Read Only Memory (EEPROM) which retains data in a non-volatile manner. A contact pad 2 of eight contacts 2*a* to 2*h* on the surface of the card allows connection to reader/writer units. In use, a card may be loaded with data representing value from a reader/writer coupled to the user's bank. Purchases may then be made off-line from the bank by transferring value data to a trader's electronic purse by means of a point of sale reader/writer. Ultimately the trader-may transfer accumulated value to his own bank from his electronic purse.

Conventionally, communication for data transfer via a reader/writer is serial communication established by way of a pair of contacts in the contact pad 2 under a certain protocol. An example of such a protocol is known under the designation ISO/IEC 7816, which will be referred to hereinafter as "the protocol". Implementation of the full protocol requires a degree of sophistication in the reader/writer microprocessor and program which renders such reader/writers relatively expensive. There is a requirement for a small and inexpensive device which can read and use (typically but not necessarily for display) certain data from the card.

FIG. 1 shows such a device as a key-fob reader 3. The reader has a body 4 with a hole 5 near one end for attachment to a key-ring. The other end of the reader has a slot 6 for the insertion of a card such as card 1. The reader with the card inserted is shown in FIG. 2. Within the reader are spring loaded contacts which couple with respective contacts on pad 2 when the card is fully inserted. The simple act of insertion of the card into the slot 6 effects connection between the respective card and reader contacts. This causes power to be applied to the card from a battery in the reader. Then a reset signal is sent from the reader to the card and an answer-to-reset (ART) signal is sent from the card to the reader. The ATR signal, in accordance with the invention, includes particular variable information derived from the card EEPROM. In this example the information is the balance of the value data in the card. The automatic read procedure concludes with interpretation in the reader, of the transmitted balance value data and display of-the-balance on a liquid crystal display (LCD) 7.

Figure 3:
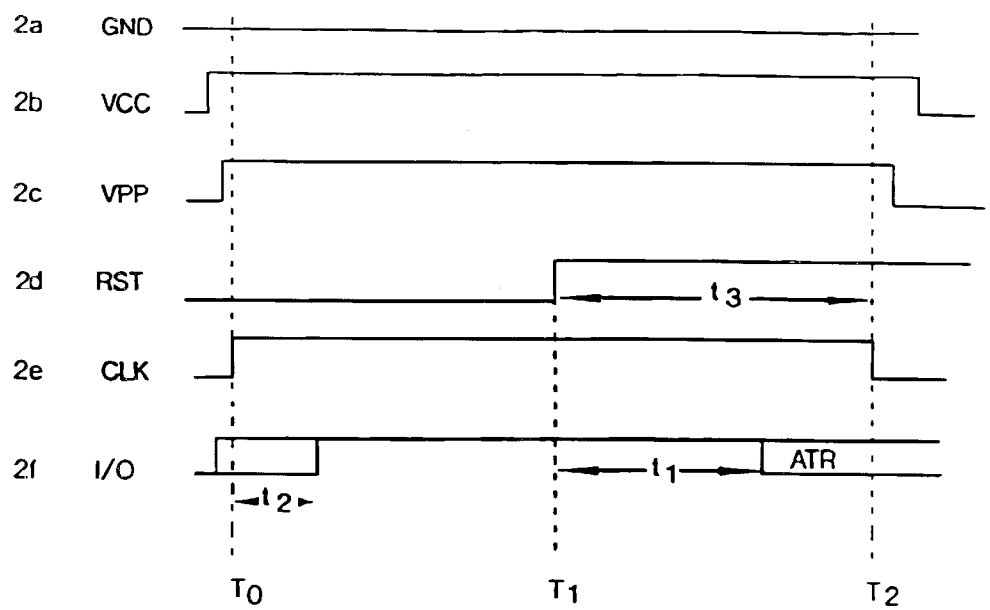
FIG. 3 is a timing diagram illustrating the timing of the reset and answer-to-reset sequence employed in the reader and card of FIGS. 1 and 2.

Referring to FIG. 3 there is shown a diagram illustrating the timing of the reset and answer-to-reset signals in accordance with the ISO protocol. Six of the eight contacts 2(*a*) to 2(*h*) are used and the signals on these are:

| 2 (a) | GND (ground) |
| 2 (b) | VCC (supply voltage) |
| 2 (c) | VPP (programming voltage) |
| 2 (d) | RST (reset signal) |

*-continued*

| 2 (e) | CLK (clock signal) |
| 2 (f) | I/O (data input/output) |

When the smart card is inserted into the reader its presence is detected by the reader hardware and the microprocessor within the reader is powered on. The software controlling the reader microprocessor checks that the smart card is still inserted and applies power to the lines VCC and VPP and, (at time t2) the I/O line is set to a state suitable for transfer of data.

The reset line RST is held low for 4000 clock cycles (t3) from t0. Thereafter an answer-to-reset (ATR) serial signal is initiated from the card under control of its microprocessor between 400 and 4000 clock cycles (t1).

Figure 4:
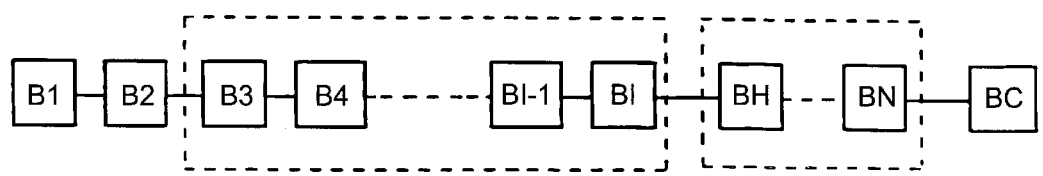
FIG. 4 is a diagram of a conventional answer-to-reset signal.

FIG. 4 illustrates the nature of the ATR signal. Conventionally the ATR signal comprises a number of serial eight-bit bytes. The first byte B1 is an initial character. The second byte B2 is a format character. There follows a number of optional interface characters B3 to BI; up to fifteen optional historical characters BH to BN and a conditional check character BC. The total number of characters after the initial character cannot exceed 32. The historical characters are often used by the card manufacturer to convey specific card identification information such as manufacturing serial number. In the present embodiment of the invention the last eight bytes of the historical character block are filled with card value balance information. Thus, this is transmitted automatically to the reader on application of the card.

Figure 5:
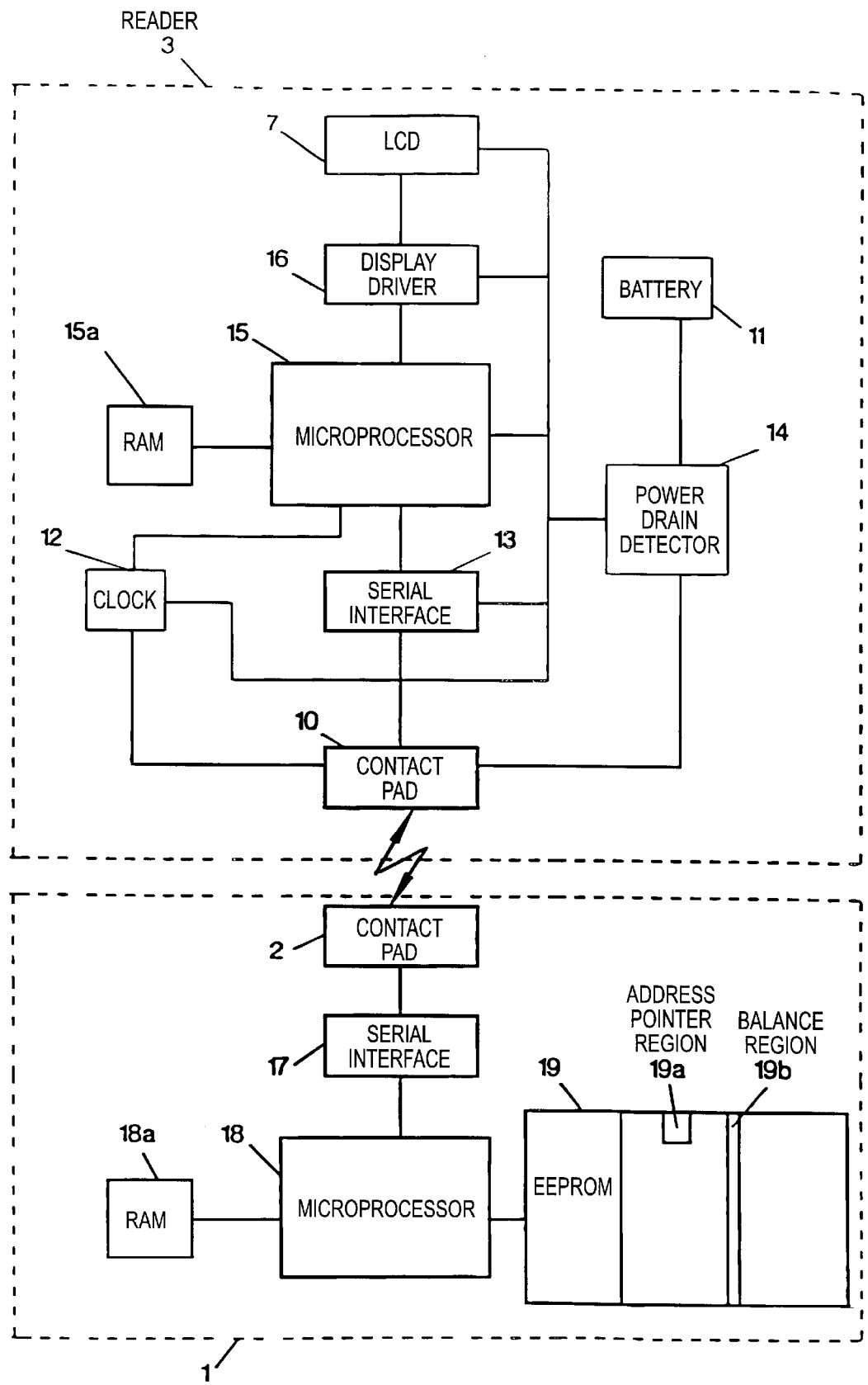
FIG. 5 is a block diagram of the electronic components of the reader and card.

Referring now to FIG. 5 the electronic components of the reader and card are illustrated schematically. Although illustrated separately in the drawing, it is to be understood that most, if not all, of the electronic components described are embodied in a single integrated circuit chip. The spring contacts of the reader 3 are shown as a pad 10. This makes contact when the card is inserted with contact pad 2 on the card. Contacts on pad 10 are connected to a battery 11, a clock 12 and a serial interface 13.

When the card is inserted power is taken for the card via the contact pads. A power drain detector 14 thus detects the insertion of the card and responds to apply power to the serial interface 13, the clock 12, a microprocessor 15 and a display driver 16. Microprocessor 15 uses random access memory (RAM) 15*a*.

On being powered up the microprocessor responds to a boot-up program in a read only memory (ROM) and transmits the clock and reset signals described with reference to FIG. 3. The card has a serial interface 17 connected to the pad 2, a microprocessor 18 and an EEPROM 19. Microprocessor 18 uses random access memory (RAM) 18*a*. The EEPROM has a program section P which detects the end of the reset signal and then controls the interface, via the microprocessor, to transmit the ATR signal. The final eight bytes of the ATR signal are derived from information contained in the EEPROM. An address pointer region 19*a* of the EEPROM contains an address pointer which is the address of a balance region 19*b* of the memory. The balance region contains the current value balance of the card. Thus, in response to the reset signal the microprocessor 18 reads the address pointer at 19*a*, then the contents of region 19*b* and constructs the last eight bytes of the ATR signal to include the balance information.

The ATR signal is transmitted via interface 17 and interface 13 to be processed by the microprocessor 15. The program which drives microprocessor 15 decodes the value signal derived from interface 13 and applies the result to display driver 16 whereby the value is displayed on the LCD 7.

Referring now to FIG. 6 there is shown a flow diagram for the programs driving the microprocessors 15 and 18. FIG. 6(*a*) shows the reader program for processor 15. On power up at 21 the clock and reset signals are sent. At 22 there is a test to determine whether the ATR signal has been received within the permitted time slot. If NO, the reader is closed down. If YES, then the ATR is decoded at 23 to derive the balance value. At 24 there is a test to determine if the decoded information is meaningful. If NO an error message is constructed at 25 and displayed. If NO then at 26 the balance value is formatted for display and displayed. After a period of 3 seconds at 27 the reader is shut down.

In the card (FIG. 6(*b*)) there is a test at 28 to determine whether the reset signal has terminated. If NO, then the system waits. If YES, then at 29 the address pointer at 19*a* (FIG. 5) is read. Then the data at the designated address 19*b* is read at 30. Then the value balance data thus read is encoded at 31 into the ATR which is then sent at 32.

Referring now to FIG. 7 there is shown a modification to the flow chart for the card. After step 32 when the ATR signal is sent the system writes, at 33, a new pointer address to 19*a* (FIG. 5). This new address is derived as the next in cyclic sequence of addresses, the sequence being stored in the EEPROM. This means that next time the card is powered up a new address pointer will be read which will result in data from a different address being encoded into the ATR. The sequence of addresses is selected so that different required information is displayed on the reader each time the card is inserted. Thus, there may be two, three, four or more pieces of information displayed by the reader in turn each time the card is removed and inserted. Examples of other read-outs in the electronic purse embodiment is given the amount of the last transaction or the amount last drawn down from or refunded to the bank.

It is important to note that if the protocol is followed exactly, then the card will be held in a reset state for 40,000 clock cycles, and must commence a further transmission of the ATR bytes within a further 40,000 clock cycles. The commonly used clock speed is 3.57 MHz, therefore, each of these figures corresponds to 11 milliseconds. The maximum length of the ATR is 32 bytes, which takes about 35 milliseconds to be transmitted at 9600 bps. Therefore power is only ever applied to the card by the reader for a maximum duration of 11+11+35=57 milliseconds.

It will be seen that the reader requires only information which is transmitted as part of the ATR bytes emitted by the card at power on. Therefore there is no need to send a command requesting the current balance to the card, and no corresponding need for a communications protocol to be used during data transmission. As the card has no knowledge of absolute time, it can be operated at very low clock speeds to obtain the ATR. All of these factors make the design of the reader very simple, and achievable with a very low cost microprocessor or appropriate logic, thus producing a very low cost design. As the card need only be powered on for a very short period of time for each balance display the demands on the battery are minimal.

The invention is not restricted to the details of the above-described embodiment. For example, other parts of the ATR signal may be used to convey the required use-variable data, perhaps different or fewer or greater bytes of the historic bytes portion, or perhaps bytes other than the in-store bytes.

Instead of incorporating a general purpose microprocessor and program memory, the reader may incorporate a specifically designed logic arrangement as an array of interconnected gates and associated circuit components designed as an application specific integrated circuit, for example.

The reader may take other forms and may be incorporated in a security device such as a lock which may be released on receipt of appropriate data transmitted in this way from a smart access card. Display of the information may not be necessary or even desirable in such situations.

Coupling between card and reader may be other than by electrical contacts. Proposals exist, for example, to couple cards and readers by induction, radio or microwaves, and acoustic or infra-red optical interfaces. The invention is applicable to any method of coupling.

The address pointer may be re-written even if only one type of use-variable data is to be accessed since, depending on the use of the card, the same data (for example value balance) may be written at various places in the memory from time to time. Finally, although EEPROM is currently favoured as memory for this purpose, other kinds of memory may be used.

What is claimed is:

1. A method of reading data from a smart card, the smart card having a microprocessor and a memory holding use-variable data, the method comprising:

coupling a reader to the card to establish a data transmission path between the reader and the card;

accessing required use-variable data in said memory, and incorporating said accessed data as part of an answer-to-reset signal transmitted from the card to the reader.

2. A method of reading data from a smart card as claimed in claim 1 wherein the format of the answer-to-reset signal is in accordance with the ISO/IEC 7816 protocol and includes historic bytes, the said accessed data being incorporated as historic bytes.

3. A method of reading data from a smart card as claimed in claim 1 wherein the memory holds an address pointer which designates the memory address of the data to be accessed, the address pointer being read as a preliminary to accessing said data.

4. A method of reading data from a smart card as claimed in claim 3 wherein the address of the data to be accessed varies and the address pointer is rewritten accordingly.

5. A method of reading data from a smart card as claimed in claim 4 wherein the address pointer is rewritten on each reading of data in a cyclic fashion so as to step around a predetermined cyclic pattern, whereby predetermined different sets of data are read in succession in successive uses of the reader.

6. A method of reading data from a smart card as claimed in claim 1 including the steps of coupling of the card with the reader, automatically sending a reset signal from the reader to the card on such detection, automatically sending said answer-to-reset signal from the card to the reader in response to the reset signal, automatically interpreting the use-variable data in the answer-to-reset signal and using the interpreted data.

7. A method of reading data from a smart card as claimed in claim 6 wherein there is a display in the reader and the interpreted data is used by activating the display to display the data.

8. A reader adapted to read data from a smart card in accordance with the method of claim 1, the reader comprising a battery, an interface arrangement for coupling to a smart card and circuit means effective to interpret a specific part of any answer-to-reset signals received via the interface to derive use-variable data included therein.

9. A reader as claimed in claim 8 wherein the circuit means comprises a microprocessor and memory which includes a program effective to control the microprocessor to effect said interpretation.

10. A reader as claimed in claim 9 including detector means responsive to the coupling of a smart card with the reader and means responsive to the detector means to power up the reader microprocessor or said coupling, he microprocessor being otherwise powered down to conserve battery life.

11. A reader as claimed in claim 8 which operates under the ISO 7816 protocol at least insofar as the format of the answer-to-receive signal is concerned, said signal thus having historic bytes and said use-variable data being incorporated in the historic bytes.

12. A reader as claimed in claim 8 which includes a display for displaying the use-variable data read from the card.

13. A reader as claimed in claim 8 which is smaller than the credit card-sized smart card and which has a slot and within the slot a set of spring contacts, the slot accepting a portion of a smart card whereby electrical contact is established between smart card contacts on a contact pad on the card and said spring contacts.

14. A smart card adapted to have data read in accordance with the method claimed in claim 1 the card having a microprocessor and a memory, a memory region holding use-variable data, and a memory region holding an operating program, the operating program being effective to include, in answer-to-reset signals generated by the card, specific use-variable data accessed from the memory.

15. A smart card as claimed in claim 14 wherein the memory includes an address pointer which holds the address of data to be accessed for inclusion in the answer-to-reset signal.

16. A smart card as claimed in claim 15 wherein the program is effective to control the microprocessor to re-write the address pointer on each reading of data in a cyclic fashion so as to step around a predetermined cyclic pattern, whereby predetermined different sets of data are read in succession in successive uses of a reader.

17. A smart card as claimed in any of claim 14 which is an electronic purse in a value transfer system, the said use-variable data being the balance of value data on the card.

\* \* \* \* \*